(12) United States Patent
Pereira

(10) Patent No.: US 6,934,773 B2
(45) Date of Patent: Aug. 23, 2005

(54) COMPUTER SYSTEM FOR ENABLING AN OPTICAL DRIVE TO SELF-TEST ANALOG AUDIO SIGNAL PATHS WHEN NO DISC IS PRESENT

(75) Inventor: David Pereira, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 7 days.

(21) Appl. No.: 10/888,469

(22) Filed: Jul. 9, 2004

(65) Prior Publication Data

US 2004/0260847 A1 Dec. 23, 2004

Related U.S. Application Data

(63) Continuation of application No. 10/054,320, filed on Nov. 13, 2001, now Pat. No. 6,789,139.

(51) Int. Cl.[7] .................................................. G06F 3/00
(52) U.S. Cl. ........................... 710/17; 710/36; 710/74
(58) Field of Search ........................... 710/15, 17, 18, 710/36, 72, 73, 74, 101; 709/300, 302; 711/100, 115

(56) References Cited

U.S. PATENT DOCUMENTS

| | | | | |
|---|---|---|---|---|
| 3,689,079 A | * | 9/1972 | Hitoshi et al. ........... 369/33.01 |
| 5,561,395 A | * | 10/1996 | Melton et al. ................. 330/2 |
| 5,770,812 A | * | 6/1998 | Kitayama ..................... 84/603 |
| 5,786,814 A | * | 7/1998 | Moran et al. ............... 715/720 |
| 6,011,210 A | * | 1/2000 | Haruyama et al. ........ 84/470 R |
| 6,243,343 B1 | * | 6/2001 | Ishimura et al. ......... 369/53.41 |
| 6,356,971 B1 | * | 3/2002 | Katz et al. .................. 710/301 |
| 2004/0039969 A1 | | 2/2004 | Pratt et al. |

* cited by examiner

*Primary Examiner*—Jeffrey Gaffin
*Assistant Examiner*—Alan Chen
(74) *Attorney, Agent, or Firm*—Haynes and Boone, LLP

(57) ABSTRACT

A computer system includes a chassis, a processor mounted in the chassis, a memory coupled to the processor, and an optical disc drive coupled to the processor and the memory, the optical disc drive comprising a removable storage media, the optical disc drive being configurable to internally generate an audio tone signal in response to receiving a command during an absence of the removable storage media; to receive a second command, wherein the second command generates a corresponding second audio tone signal and to receive a third command, and wherein the third command is configurable to stop the generation of the second audio tone signal.

11 Claims, 3 Drawing Sheets

COMPUTER SYSTEM FOR ENABLING AN OPTICAL DRIVE TO SELF-TEST ANALOG AUDIO SIGNAL PATHS WHEN NO DISC IS PRESENT

CROSS-REFERENCE TO RELATED APPLICATIONS

This application claims priority to and is a continuation of co-owned, U.S. patent application Ser. No. 10/054,320, filed Nov. 13, 2001 now U.S. Pat. No. 6,789,139, by David M. Pereira, entitled METHOD FOR ENABLING AN OPTICAL DRIVE TO SELF-TEST ANALOG AUDIO SIGNAL PATHS WHEN NO DISC IS PRESENT, which is incorporated herein by reference in its entirety.

BACKGROUND

The present disclosure relates to the testing of computer systems. More specifically, the present disclosure relates to the implementation of a method and a system for testing audio components of a computer system's optical disc drive.

Information systems in general have attained widespread use in business as well as personal computing environments. An information handling system, as referred to herein, may be defined as an instrumentality or aggregate of instrumentalities primarily designed to compute, classify, process, transmit, receive, retrieve, originate, switch, store, display, manifest, detect, record, reproduce, handle or utilize any form of information, intelligence or data for business, scientific, control or other purposes. The information handling system may be configured for a specific user application or requirement such as financial transaction processing, airline reservations, enterprise data storage and/or global communications. In general, an information handling system may include a variety of hardware and/or software components that may be configured to provide information and/or consume information. An information handling system may include one or more computer systems, data storage systems, and/or networking systems.

A computer system, which is one common type of information handling system, may be designed to give independent computing power to one or a plurality of users. Computer systems may be found in many forms including, for example, mainframes, minicomputers, workstations, servers, clients, personal computers, Internet terminals, notebooks, personal digital assistants, and embedded systems.

A computer system may be available as a desktop, floor-standing unit, or as a portable unit. The computer system typically includes a microcomputer unit having a processor, volatile and/or non-volatile memory, a display monitor, a keyboard, one or more floppy diskette drives, a hard disc storage device, an optional optical drive, e.g., DVD, CD-R, CD-RW, Combination DVD/CD-RW or CD-ROM, and an optional printer. A computer system also includes a commercially available operating system, such as Microsoft Windows XP™ or Linux. A computer system may also include one or a plurality of peripheral devices such as input/output ("I/O") devices coupled to the system processor to perform specialized functions. Examples of I/O devices include keyboard interfaces with keyboard controllers, floppy diskette drive controllers, modems, sound and video devices, specialized communication devices, and even other computer systems communicating with each other via a network. These I/O devices are typically plugged into connectors of computer system I/O interfaces such as serial interfaces and parallel interfaces, for example. Generally, these computer systems use a system board or motherboard to electrically interconnect these devices.

Computer systems also typically include basic input/output system ("BIOS") programs to ease programmer/user interaction with the computer system devices. More specifically, BIOS provides a software interface between the system hardware and the operating system/application program. The operating system ("OS") and application program typically access BIOS rather than directly manipulating I/O ports, registers, and control words of the specific system hardware. Well known device drivers and interrupt handlers access BIOS to, for example, facilitate I/O data transfer between peripheral devices and the OS, application program, and data storage elements. BIOS is accessed through an interface of software interrupts and contains a plurality of entry points corresponding respectively to the different interrupts. In operation, BIOS is typically loaded from a BIOS ROM or BIOS EPROM, where it is nonvolatily stored, to main memory from which it is executed. This practice is referred to as "shadowing" or "shadow RAM" and increases the speed at which BIOS executes.

Although the processor provides the "kernel" of the computer system, 1/O communication between an 1/O device and the processor forms a basic feature of computer systems. Many I/O devices include specialized hardware working in conjunction with OS specific device drivers and BIOS routines to perform functions such as information transfer between the processor and external devices, such as modems and printers, coupled to 1/O devices.

Computer systems typically include peripheral memory storage devices such as optical disc drives with removable storage media. The removable storage media is typically used to store and/or load software, data, and documentation. Examples of optical disc drives with removable storage media include audio CD, CD-ROM, CD-R, CD-RW, DVD and combination DVD/CD-RW. To load the selected operating system on to the hard disc for the first time, the PC manufacturer typically uses a boot device to initially boot up the PC. A boot device may typically include a floppy disc or a CD-ROM.

The personal computer business is rapidly moving toward "build-to-order" manufacturing. The customer typically enters a purchase order for a computer system by selecting specific options such as processor model/speed, memory size, hard disc size, peripheral devices such as CRT monitor size, resolution, keyboard, CD-RW, DVD, printers and others. The computer system purchase order usually includes the choice for an operating system such as Windows XP™, Windows ME™, or in some cases Linux. The computer system manufacturer assembles the computer system hardware in compliance with the purchase order.

After completion of the hardware and software assembly process, the computer system undergoes extensive inspection and testing. The PC manufacturer typically ships the custom manufactured computer system within a few days to the customer after receipt of purchase order. Typically a PC manufacturer may ship several thousand "build-to-order" computer systems every day.

During the manufacturing process of a personal computer, the inspection and testing phase is typically important to identify product defects. Generally, it is more cost effective to identify and fix product defects before shipment to a customer site. The testing of personal computer peripheral devices such as optical disc drives with removable storage media is time-consuming. For example, the testing phase of the CD-ROM device typically involves manually inserting a test CD-ROM in the drive and conducting the test procedure. The "build-to-order" manufacturing process of a personal computer or the disc drive with removable media typically involves an assembly line operation capable of producing thousands of units each hour. The step of manually inserting the removable media for test purposes in the manufacturing of several thousand personal computers typically slows down the manufacturing process and also adds to the product costs.

FIG. 1 (PRIOR ART) is a diagram schematically illustrating the simplified structure of a general optical drive system. Referring to FIG. 1 (PRIOR ART), a spindle motor 110 rotates an optical disc 115, which is seated on a turntable 120. On inserting the optical disc 115 in the disc drive, a clamp 125 assembly may be used to secure the position of the optical disc 115 on the turntable 120 such that the inserted optical disc 115 is frictionally coupled to the turntable 120. Several types of clamp 125 mechanism are well known in the art, depending on the dimensions of the optical disc drive. A sensor device 130 is used for reproducing the information recorded on the optical disc 115. A disc controller 140 controls the overall disc drive system, including the spindle motor 110 and the sensor device 130.

For CD-ROM's, the sensor device 130 assembly (not shown) typically includes a low-power laser diode, a lens, a focusing coil, a prism and a light detecting diode. For optical disc drives, the sensor device 130 assembly (not shown) typically includes at least one low-power laser diode, focusing and positioning coils, additional optical components, and a light-detecting diode assembly. Information is encoded in a plastic-encased spiral track (not shown) contained on one side of the optical disc 115. The spiral track is read optically by the sensor device 130, which typically includes a non-contact head, and which scans approximately radially as the disc spins just above it.

The disc controller 140 typically includes a processor (not shown), e.g., a digital signal processor ("DSP") and/or a microprocessor. The processor is typically configurable to perform various control functions such as reading data and/or sound files stored on the optical disc 115. The optical disc drive also generally includes an audio circuit to output the audio files stored on the removable optical disc storage. For computer systems equipped with sound circuitry, the audio output of the optical disc device is typically directly connected to the sound circuitry via a cable. For computer systems without sound circuitry, the audio output of the optical disc device may be typically directly accessible via an audio jack (not shown). A sound output device such as a loudspeaker, or a headphone may be connectable to the audio jack of the optical disc device to listen to the sound.

SUMMARY

In accordance with the present disclosure, one embodiment discloses a computer system including a chassis, a processor mounted in the chassis, a memory coupled to the processor, and an optical disc drive coupled to the processor and the memory, the optical disc drive comprising a removable storage media, the optical disc drive being configurable to internally generate an audio tone signal in response to receiving a command during an absence of the removable storage media, to receive a second command, wherein the second command generates a corresponding second audio tone signal and to receive a third command, and wherein the third command is configurable to stop the generation of the second audio tone signal.

BRIEF DESCRIPTION OF THE DRAWINGS

The present disclosure may be better understood, and its numerous objects, features and advantages made apparent to those skilled in the art by referencing the accompanying drawings. The use of the same reference number throughout the several figures designates a like or similar element.

DETAILED DESCRIPTION

For a thorough understanding of the subject disclosure, including the best mode contemplated by the inventor, reference may be had to the following Detailed Description, including the appended Claims, in connection with the above-described Drawings. The following Detailed Description is intended to be illustrative only and not limiting.

Figure 1:
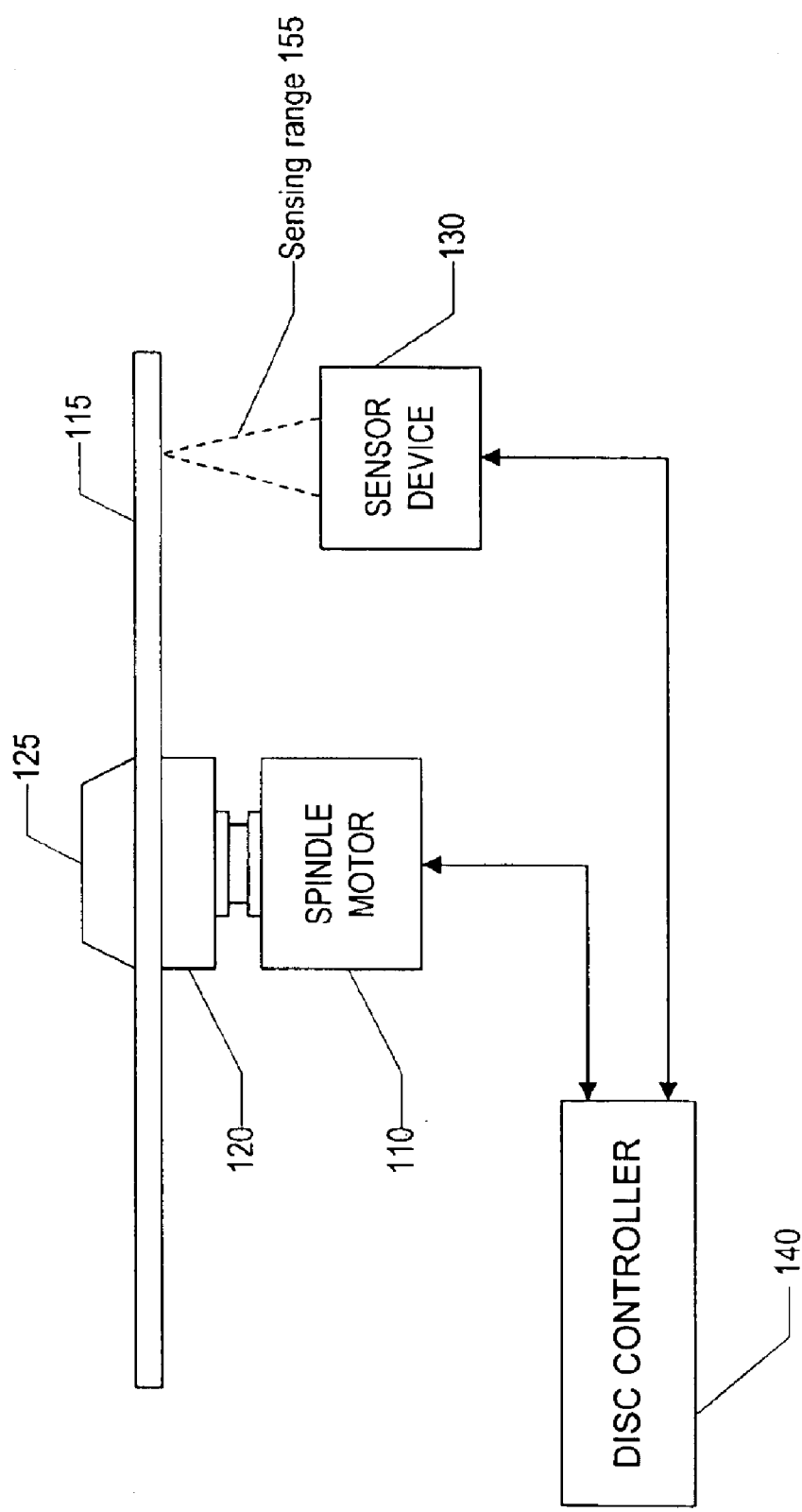
FIG. 1 (PRIOR ART) is a diagram schematically illustrating the simplified structure of a general optical disc drive system.
Figure 2:
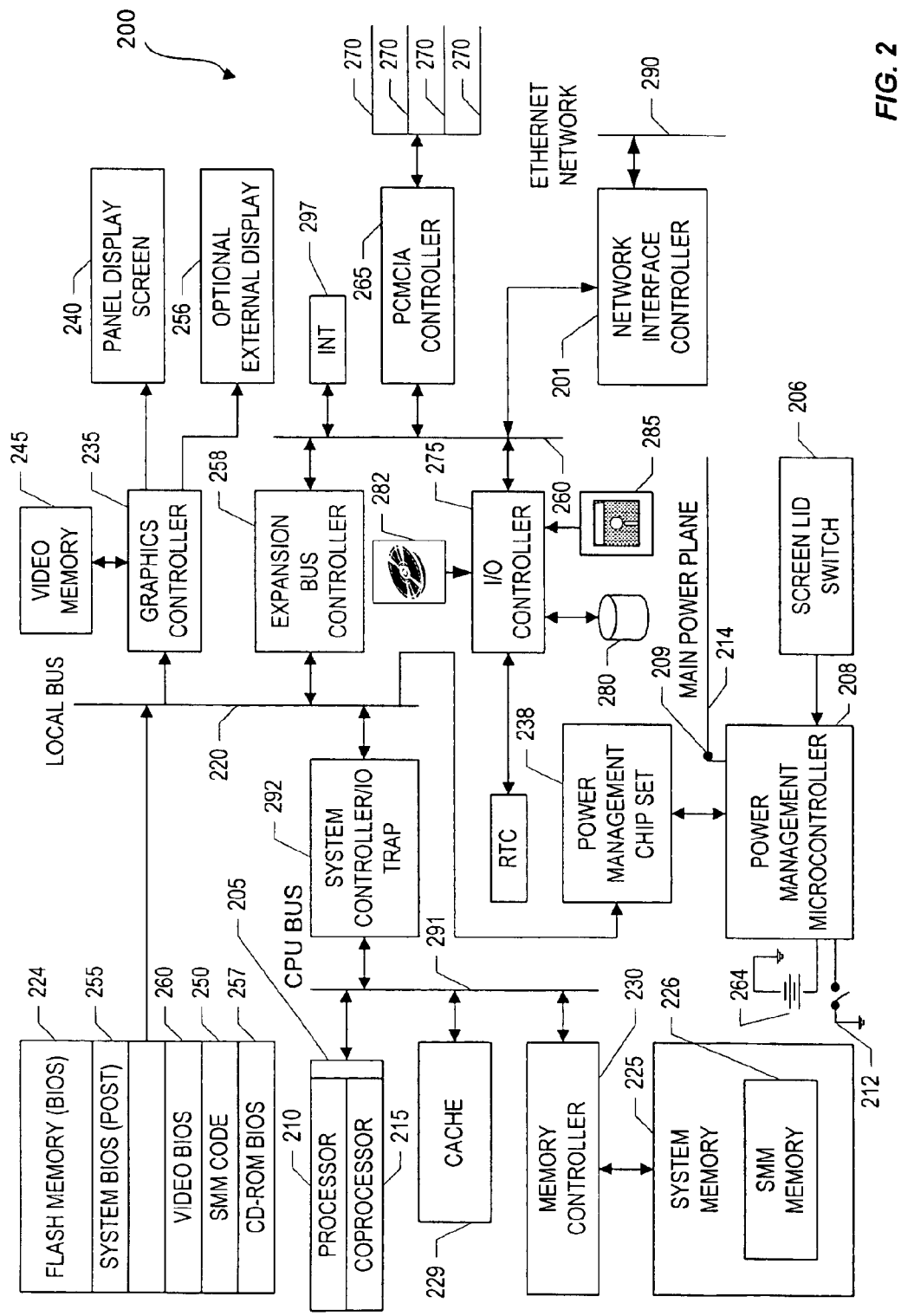
FIG. 2 illustrates an information handling system to implement a method of audio testing a disc drive device by internally generating an audio tone signal in accordance with the present disclosure.

Referring to FIG. 2, an information handling system 200 is shown that is suitable for implementing a method for testing audio components of the computer system's optical disc drive. In one embodiment, the information handling system 200 is a computer system.

Information handling system 200 includes a microprocessor ("processor") 205, for example, an Intel Pentium™ class microprocessor or AMD Athlon™ class microprocessor, having a processor 210 for handling integer operations and a co-processor 215 for handling floating point operations. Processor 205 is coupled to cache 229 and memory controller 230 via processor bus 291. System controller I/O trap 292 couples processor bus 291 to local bus 220 and is generally characterized as part of a system controller such as a Pico Power Vesuvious or an Intel™ Mobile Triton chip set. System controller I/O trap 292 can be programmed in a well-known manner to intercept a particular target address or address range, and, upon intercepting a target address, system controller I/O trap 292 asserts an intercept signal indicating that processor 205 attempted to access the target address.

A main memory 225 of dynamic random access memory ("DRAM") modules is coupled to local bus 220 by a memory controller 230. Main memory 225 includes a system management mode memory area which is employed to store converter code to implement conversion methodology embodiments as will be discussed in more detail subsequently.

In a simple form, a information handling system 200 may include a processor 205 and a memory 225. The processor 205 is typically enabled to execute instructions stored in the memory 225. The executed instructions typically perform a function. Information handling systems may vary in size, shape, performance, functionality and price. Examples of a information handling system 200, which include a processor 205 and memory 225, may include all types of computing devices within the range from a pager to a mainframe computer.

A BIOS memory 224 is coupled to local bus 220. A FLASH memory or other nonvolatile memory is used as BIOS memory 224. A BIOS program (not shown) is usually stored in the BIOS memory 224. The BIOS program includes software for interaction with the information handling system boot devices such as the keyboard, the mouse, or an optical disc 282. The BIOS memory 224 stores the system code, which controls some information handling system 200 operations.

A graphics controller 235 is coupled to local bus 220 and to a panel display screen 240. Graphics controller 235 is also coupled to a video memory 245, which stores information to be displayed on panel display 240. Panel display 240 is typically an active matrix or passive matrix liquid crystal display ("LCD") although other display technologies may be used as well. Graphics controller 235 can also be coupled to an optional external display or standalone monitor display 256 as shown in FIG. 2. One graphics controller that can be employed as graphics controller 235 is the Western Digital WD90C24A graphics controller.

A bus interface controller or expansion bus controller 258 couples local bus 220 to an expansion bus 260. In this particular embodiment, expansion bus 260 is an Industry Standard Architecture ("ISA") bus although other buses, for example, a Peripheral Component Interconnect ("PCI") bus, could also be used. A personal computer memory card international association ("PCMCIA") controller 265 is also coupled to expansion bus 260 as shown. PCMCIA controller 265 is coupled to a plurality of expansion slots 270 to receive PCMCIA expansion cards such as modems, fax cards, communications cards, and other input/output devices. Interrupt request generator 297 is also coupled to ISA bus 260 and issues an interrupt service request over a predetermined interrupt request line after receiving a request to issue interrupt instruction from processor 205.

An I/O controller 275, often referred to as a super I/O controller is coupled to ISA bus 260. I/O controller 275 interfaces to an integrated drive electronics ("IDE") hard drive 280, a optical disc drive 282 and a floppy drive 285. Other disc drive devices (not shown) which may also be interfaced to the I/O controller include a removable hard drive, a zip drive, a CD-RW drive, and a CD-DVD drive. A network interface controller 201 enables the information handling system 200 to communicate with a computer network such as an Ethernet 290. The information handling system may also include a computer network such as a local area network ("LAN"), wide area network ("WAN"), Internet, Intranet, wireless broadband and the like. The network interface controller 201 forms a network interface for communicating with other information handling systems (not shown) connected to the Ethernet 290. The information handling system's networking components generally include hardware as well as software components. Examples of the hardware components include the network interface controller 201 and the Ethernet 290. Examples of the software components, which include messaging services and network administration services, are described below.

The information handling system 200 serves as a controller for resolving proprietary and standard event and message structures into a common format for use by the computer network for many management purposes. The information handling system 200 is connected with a plurality of computer systems in the network for receiving messages from the computer systems, analyzing the messages and determine an effective utilization of the messages as directed by a user or network administrator. The information handling system 200 receives messages in different message formats, organizes the messages, and converts the messages into a common format that assists a user, system administrator, or network administrator in utilizing the information contained in the messages. The information handling system 200 supports the conversion of messages into the common format to facilitate particular network applications.

Information handling system 200 includes a power supply 264, for example, a battery, which provides power to the many devices, which form information handling system 200. Power supply 264 is typically a rechargeable battery, such as a nickel metal hydride ("NiMl1") or lithium ion battery, when information handling system 200 is embodied as a portable or notebook computer. Power supply 264 is coupled to a power management microcontroller 208 which controls the distribution of power from power supply 264. More specifically, microcontroller 208 includes a power output 209 coupled to the main power plane 214 which supplies power to processor 205. Power microcontroller 208 is also coupled to a power plane (not shown) which supplies power to panel display 240. In this particular embodiment, power control microcontroller 208 is a Motorola 6805 microcontroller. Microcontroller 208 monitors the charge level of power supply 264 to determine when to charge and when not to charge battery 264. Microcontroller 208 is coupled to a main power switch 212, which the user actuates to turn the information handling system 200, on and off. While microcontroller 208 powers down other portions of information handling system 200 such as hard drive 280 when not in use to conserve power, micro-controller 208 itself is always coupled to a source of energy, namely power supply 264.

In a portable embodiment, information handling system 200 also includes a screen lid switch 206 or indicator 206 which provides an indication of when panel display 240 is in the open position and an indication of when panel display 240 is in the closed position. It is noted that panel display 240 is generally located in the same location in the lid of the computer as is typical for "clamshell" types of portable computers such as laptop or notebook computers. In this manner, the display screen forms an integral part of the lid of the computer, which swings from an open position for interaction with the user to a close position.

Information handling system 200 also includes a power management chip set 238, which includes power management chip models PT86C521 and PT86C522 manufactured by Pico Power. Power management chip set 238 is coupled to processor 205 via local bus 220 so that power management chip set 238 can receive power control commands from processor 205. Power management chip set 238 is connected to a plurality of individual power planes which supply power to respective devices in information handling system 200 such as hard drive 280 and floppy drive 285, for example. In this manner, power management chip set 238 acts under the direction of processor 205 to control the power to the various power planes and devices of the computer. A real time clock ("RTC") 240 is coupled to I/O controller 275 and power management chip set 238 such that time events or alarms can be transmitted to power management chip set 238. Real time clock 240 can be programmed to generate an 15 alarm signal at a predetermined time.

When information handling system 200 is turned on or powered up, the information handling system 200 enters a start up phase, also referred to as a boot up phase, during which the information handling system hardware is detected and the operating system is loaded. During the initial boot stage, the information handling system BIOS software stored in nonvolatile BIOS memory 224 is copied into main memory 225 so that it can be executed more quickly. This technique is referred to as "shadowing" or "shadow RAM" as discussed above. At this time, SMM code 250 is also copied into the system management mode memory area 226 of main memory 225. Processor 205 executes SMM code 250 after processor 205 receives a system management interrupt ("SMI") which causes the microprocessor to enter SMM. Additional conditions under which an SMI is generated are discussed subsequently. It is noted that along with SMM code 250, also stored in BIOS memory 224 and copied into main memory 225 at power up are system BIOS 255 (including a power on self test module POST), CD-ROM BIOS 257 and video BIOS 260. It will be recognized by those of ordinary skill in the art that other memory mapping schemes may be used. For example, SMM code 250 may be stored in fast SRAM memory (not shown) coupled to the local/processor bus 220.

In one embodiment, the information handling system 200 is tested to verify the proper operation of its hardware and software components. The testing of the information handling system 200 includes the testing of the audio components 283 included in the optical disc drive with removable media, e.g., optical disc drive 282. The information handling system 200 is configurable to perform the method of testing the audio components 283 of the information handling system optical disc drive 282 device with removable storage media, preferably without requiring the presence of optical disc 115, as described in further detail below. Additionally, if the audio cable is separate from the interface connector or interface cable then the testing includes determining whether an audio cable is connected between the optical disc drive 282 and the sound circuitry.

In one embodiment, the disc controller (not shown) of the optical disc drive 282 included in the information handling system 200 is enabled to internally generate an audio tone signal on executing a command. The audio components 283 may also include optional sound circuitry (not shown) coupled to the optical disc drive 282. The audio output of the optical disc drive 282 is transferred to the sound circuitry, e.g., via an audio cable or via interface connector, as an audio input to the sound circuitry. The audio tone signal generated internally, in response to receiving and executing the command, is output to an audio output device, e.g., a pair of speakers (not shown) or a headset (not shown). The headset may be coupled to the optical disc drive 282 via an external audio jack (not shown). The optical disc drive 282 testing process may be initiated either during the boot up process or after loading the operating system.

In one embodiment, the information handling system 200 includes a computer-readable medium having a computer program or information handling system 200 software accessible therefrom, the computer program including instructions for performing the method of testing the computer system drive device with removable storage media. The computer-readable medium may typically include any of the following: a magnetic storage medium, including disc and tape storage medium; an optical storage medium, including optical discs such as CD-ROM, CD-RW, CD-R, DVD and combination DVD/CD-RW; a non-volatile memory storage medium; a volatile memory storage medium; and data transmission or communications medium including packets of electronic data, and electromagnetic or fiber optic waves modulated in accordance with the instructions.

The present disclosure allows testing the operational status of the audio components 283 of the information handling system 200 optical disc drive preferably without requiring the presence of the removable storage media. For example, being able to test optical disc drive 282 device of an information handling system 200 when no optical disc 115 is present. A method, which advantageously tests the operational status of the audio components 283 of the optical disc drive when no physical removable storage media is present, is described in FIG. 3. The testing may include determining the operational status of the audio cable if present.

Figure 3:
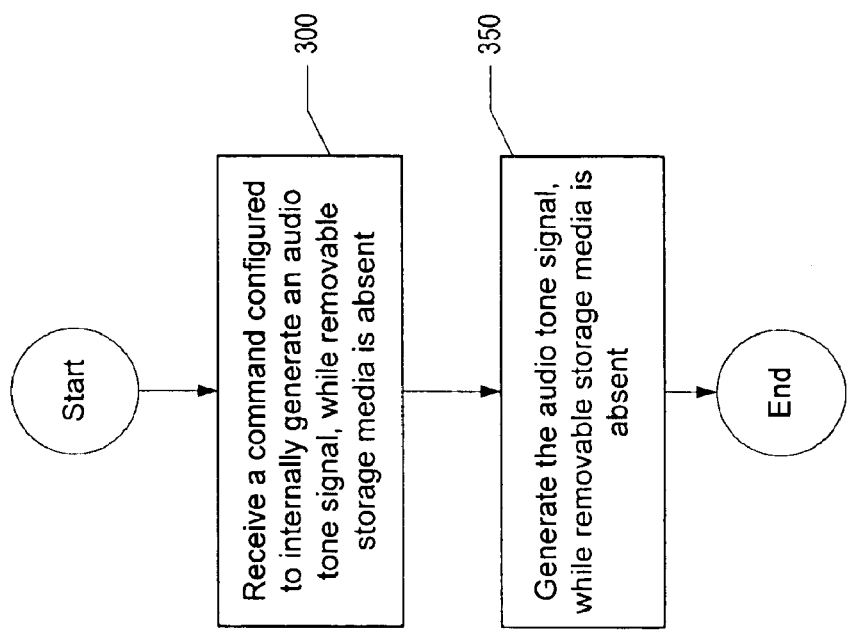
FIG. 3 illustrates a flow chart for a method of audio testing a disc drive device by internally generating an audio tone signal.

Referring to FIG. 3, a flow chart for a method of testing audio components 283 of an optical disc drive device, with removable storage media, is illustrated. In step 300, the optical disc drive is prepared to receive a command. The command is received by the information handling system 200 optical disc drive to test the operational status of the audio components 283 of the optical disc drive, preferably when no optical removable storage media is present. A command set for the optical disc drive typically includes a set of instructions, which are executable by the processor included in the disc drive controller 140. The commands enable the disc drive controller 140 to perform functions such as acquiring signals from the sensor device 130, controlling the speed of the spindle motor 110, and delivering an audio output. Under normal operation, the optical disc drive typically generates audio tone signals in response to receiving inputs from the sensor device 130. In one embodiment, the command set of the optical disc drive is modified to include at least one new command to internally generate or synthesize audio tone signals. The new command may include one or more parameters to define audio tone signal characteristics as described below. Other new commands may be included to start or stop the generation of the audio tone signal. In one embodiment, a command may internally generate audio tone signals for a configurable time period, e.g., 15 seconds. A new command may direct an audio tone signal to a right and/or a left channel for testing stereo components. A new command may generate a first audio tone signal and direct it to the left channel and generate a second audio tone signal and direct it to the right channel. The first and second audio tone signals may be generated in a substantially concurrent manner.

The audio tones may be presented by the optical drive to its normal analog outputs, thereby providing an internally generated signal source for verification of the audio cable and other portions of the audio signal path. The testing or verification process is preferably conducted when no optical removable storage media is present. The internally generated audio tone signals may be made available to a sound output device such as a headphone set via an audio jack.

In one embodiment, the command to conduct the test may be entered on the display screen 240 of the information handling system 200. In one embodiment, a computer program configured to launch the testing of the optical disc drive may enter the command. In this embodiment, at least one processor included in the disc drive controller 140 is configurable to receive the command entered. In another embodiment, a plurality of processors including a digital signal processor ("DSP") (not shown) may be included in the optical disc drive 282. The command received is configurable to internally generate an audio tone signal using some or all of the processors and the audio components 283 of the optical disc drive 282. The audio components 283 of the optical disc drive 282 may typically include an audio amplifier, a digital audio encoder/decoder, and an audio digital-to-analog ("D/A") converter. The command may include a configurable parameter to define a frequency of the audio tone signal. A second configurable parameter of the command may define the amplitude of the audio tone signal. The relationship between a command received, along with any configured parameters, and the corresponding audio tone signal generated is implemented via a look up table stored in memory as described below.

In step 350, the audio tone signal is generated internally by the disc controller 140 in response to receiving the command. In one embodiment, a sine wave generator, which is well known in the art, is used to internally generate the audio tone signal. The sine waveform is typically stored in a wavetable, and is scanned using a table-lookup oscillator algorithm. The optical disc drive controller 140 may typically include a D/A converter. Tile D/A converts the audio tone signal stored in a digital form, e.g., stored in the look up wavetable, to an analog tone signal representing an audio sound. In one embodiment, the audio tone signal may be output in the form of pulses generated at a pre-defined frequency.

In another embodiment, in step 350, the audio tone signal is generated internally, in response to receiving the command, by using a frequency generator ("PG") output provided by the spindle motor 110. The spindle motor 110 generates a pulse output, e.g., the frequency generator output, based on its rotation speed. The spindle motor 110 is rotated to a configurable speed so as to generate the audio tone signal of a defined frequency. In one embodiment, the frequency generator output is coupled to the audio components 283 of the optical disc drive 282 via a new switchable path. To generate the audio tone signal, the spindle motor is started and the switchable path is opened and closed and directed to either audio output channel under the control of the optical drive's processor. The optical disc drive 282 circuitry may be used to shape the switched output of the spindle motor 110 to provide a more pleasing sound at the desired amplitude. This embodiment may also be advantageously used to test the operational status of the spindle motor 110 component of the optical disc drive device.

In one embodiment, the information handling system 200 may be enabled to collect test data in steps 300 and 350 so as to document the operational status of the optical disc drive. The test data may include values for variables such as audio tone signal frequency and amplitude, operational status of the audio cable, right/left channel, spindle motor 110. The collected test data may be used for a test report or for later analysis.

Although the method and system of the present disclosure has been described in connection with the preferred embodiment, it is not intended to be limited to the specific form set forth herein, but on the contrary, it is intended to cover such alternatives, modifications, and equivalents, as can be reasonably included within the spirit and scope of the disclosure as defined by the appended claims.

What is claimed is:

1. A computer system comprising:
    a chassis;
    a processor mounted in the chassis;
    a memory coupled to the processor; and
    an optical disc drive coupled to the processor and the memory, the optical disc drive comprising a removable storage media, the optical disc drive being configurable to internally generate an audio tone signal in response to receiving a command during an absence of the removable storage media, to receive a second command, wherein the second command generates a corresponding second audio tone signal and to receive a third command, and wherein the third command is configurable to stop the generation of the second audio tone signal.

2. The computer system of claim 1, wherein the generated audio tone signal is transferred to a sound circuitry electrically coupled to the optical disc drive, wherein the sound circuitry outputs the audio tone signal.

3. The computer system of claim 2, wherein the audio tone signal output by the sound circuitry indicates a proper operation of the sound circuitry and a cable, wherein the cable couples the sound circuitry and the optical disc drive.

4. The computer system of claim 2, wherein the sound circuitry outputs the audio tone signal to an external sound output device coupled to the sound circuitry.

5. The computer system of claim 1, wherein the generated audio tone signal is output to an external speaker coupled to the optical disc drive.

6. A computer system comprising:
    a chassis;
    a processor mounted in the chassis;
    an input coupled to provide input to the processor; and
    an optical disc drive coupled to the processor and the memory, the optical disc drive comprising a removable storage media, the optical disc drive being configurable to internally generate an audio tone signal in response to receiving a command during an absence of the removable storage media, to receive a second command, wherein the second command generates a corresponding second audio tone signal and to receive a third command, and wherein the third command is configurable to stop the generation of the second audio tone signal.

7. The computer system of claim 6, wherein the generated audio tone signal is transferred to a sound circuitry electrically coupled to the optical disc drive, wherein the sound circuitry outputs the audio tone signal.

8. The computer system of claim 7, wherein the audio tone signal output by the sound circuitry indicates a proper operation of the sound circuitry and a cable, wherein the cable couples the sound circuitry and the optical disc drive.

9. The computer system of claim 7, wherein the sound circuitry outputs the audio tone signal to an external sound output device coupled to the sound circuitry.

10. The computer system of claim 6, wherein the generated audio tone signal is output to an external speaker coupled to the optical disc drive.

11. A computer system comprising:
    a chassis;
    a processor mounted in the chassis;
    a memory coupled to the processor; and
    an optical disc drive coupled to the processor and the memory, the optical disc drive comprising a removable storage media, the optical disc drive being configurable to internally generate an audio tone signal in response to the processor executing instructions stored in the memory, the instructions executable to:
        generate at least one command to test the optical disc drive in response to receiving a request, the optical disc drive being configured to receive a plurality of commands and generate a plurality of audio tone signals, one of the commands being configurable to stop generation of an audio tone signal.

* * * * *